United States Patent [19]
Loeber

[11] Patent Number: 5,064,023
[45] Date of Patent: Nov. 12, 1991

[54] FLEXIBLE LADDER FOR USE ON MOVING CONVEYANCES

[75] Inventor: Frederick W. Loeber, Tulsa, Okla.

[73] Assignee: Terex Corporation, Green Bay, Wis.

[21] Appl. No.: 617,992

[22] Filed: Nov. 26, 1990

[51] Int. Cl.[5] ............................ B60R 3/02; E06C 5/26
[52] U.S. Cl. ...................................... 182/90; 182/127; 182/196; 182/97; 280/166
[58] Field of Search .................. 182/90, 91, 89, 196, 182/197, 198, 127, 97; 280/166, 163

[56] References Cited

U.S. PATENT DOCUMENTS

| | | | |
|---|---|---|---|
| 3,603,429 | 12/1971 | Shepherd et al. | 182/91 |
| 3,887,216 | 6/1975 | Perry | 182/90 |
| 4,054,298 | 10/1977 | Urbaitis | 182/90 |
| 4,054,299 | 10/1977 | Urbaitis | 182/90 |
| 4,199,040 | 4/1980 | Lapeyre | 182/93 |
| 4,316,524 | 2/1982 | Lapeyre | 182/93 |
| 4,328,880 | 5/1982 | Lapeyre | 182/93 |
| 4,333,547 | 6/1982 | Johansson | 182/90 |
| 4,509,617 | 5/1985 | Lapeyre | 182/93 |
| 4,535,871 | 8/1985 | Lapeyre | 192/93 |
| 4,564,205 | 1/1986 | Shookman et al. | 280/166 |
| 4,627,200 | 12/1986 | Lapeyre | 52/191 |
| 4,673,011 | 6/1987 | Lapeyre | 144/136 |
| 4,845,841 | 7/1989 | Lapeyre | 29/791 |

FOREIGN PATENT DOCUMENTS 2816971 4/1978 Fed. Rep. of Germany .

OTHER PUBLICATIONS

"Vehicle Entry Steps" Oskega Däckservice, pamphlet, pp. 1 and 2, Date 11/6/81.

Primary Examiner—Reinaldo P. Machado
Attorney, Agent, or Firm—Head & Johnson

[57] ABSTRACT

A flexible ladder for use on moving conveyances which provides frontal stability but lateral flexibility, the ladder having a first, a second and a third strut member each formed of flexible material and each supported in a generally vertical plane, the strut members being parallel to each other with the second strut member between the first and third strut members. A first set of steps are secured between the first and second strut members and a second set of steps are secured between the second and third strut members the steps being vertically spaced apart from each other and the upper ends of each of the strut members being affixed to a moving conveyance, the ladder providing for ascent of an operator to the operating position on the conveyance but permitting lateral flexiblity if the ladder engages an obstruction on the surface on which the machine moves.

9 Claims, 5 Drawing Sheets

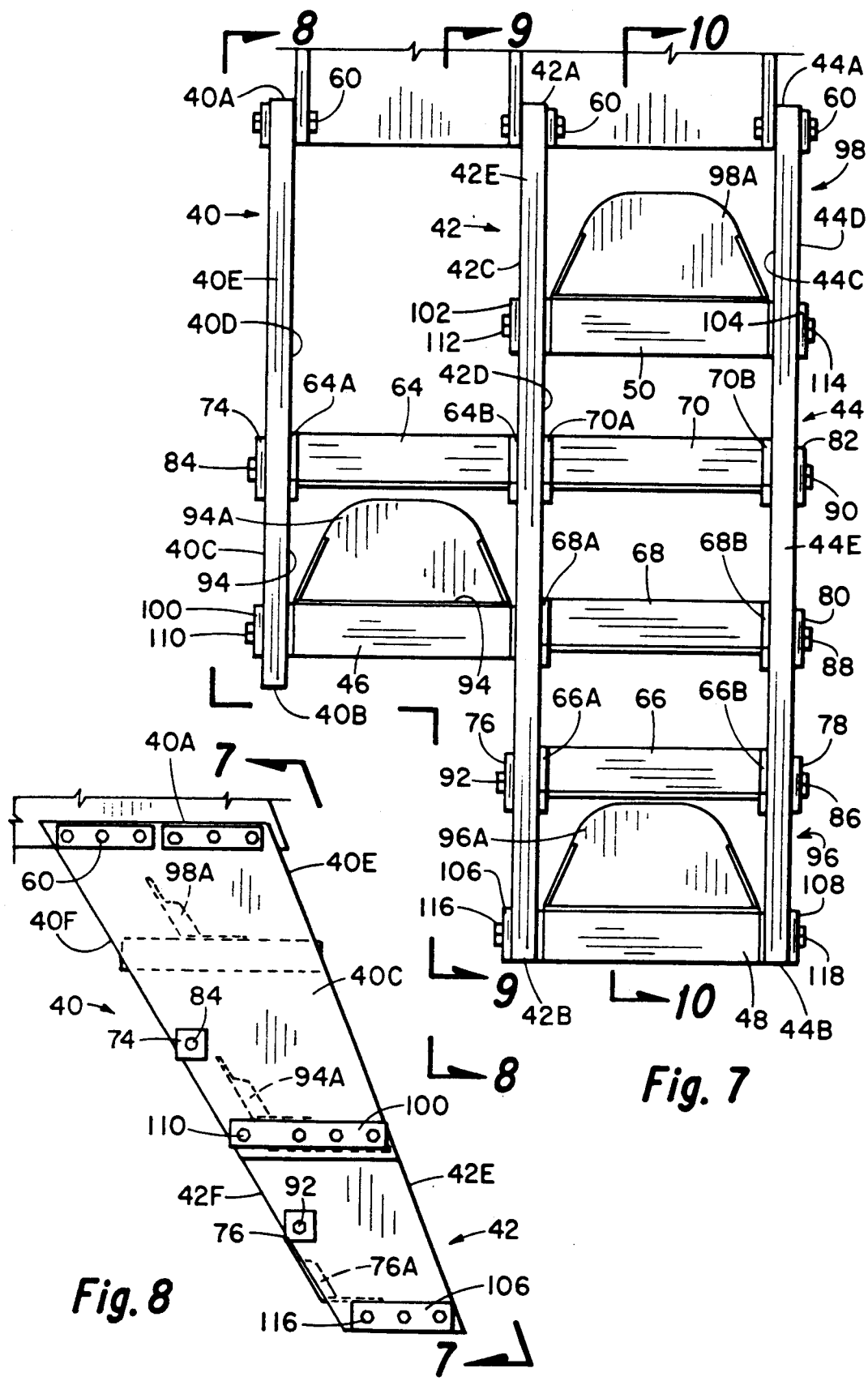

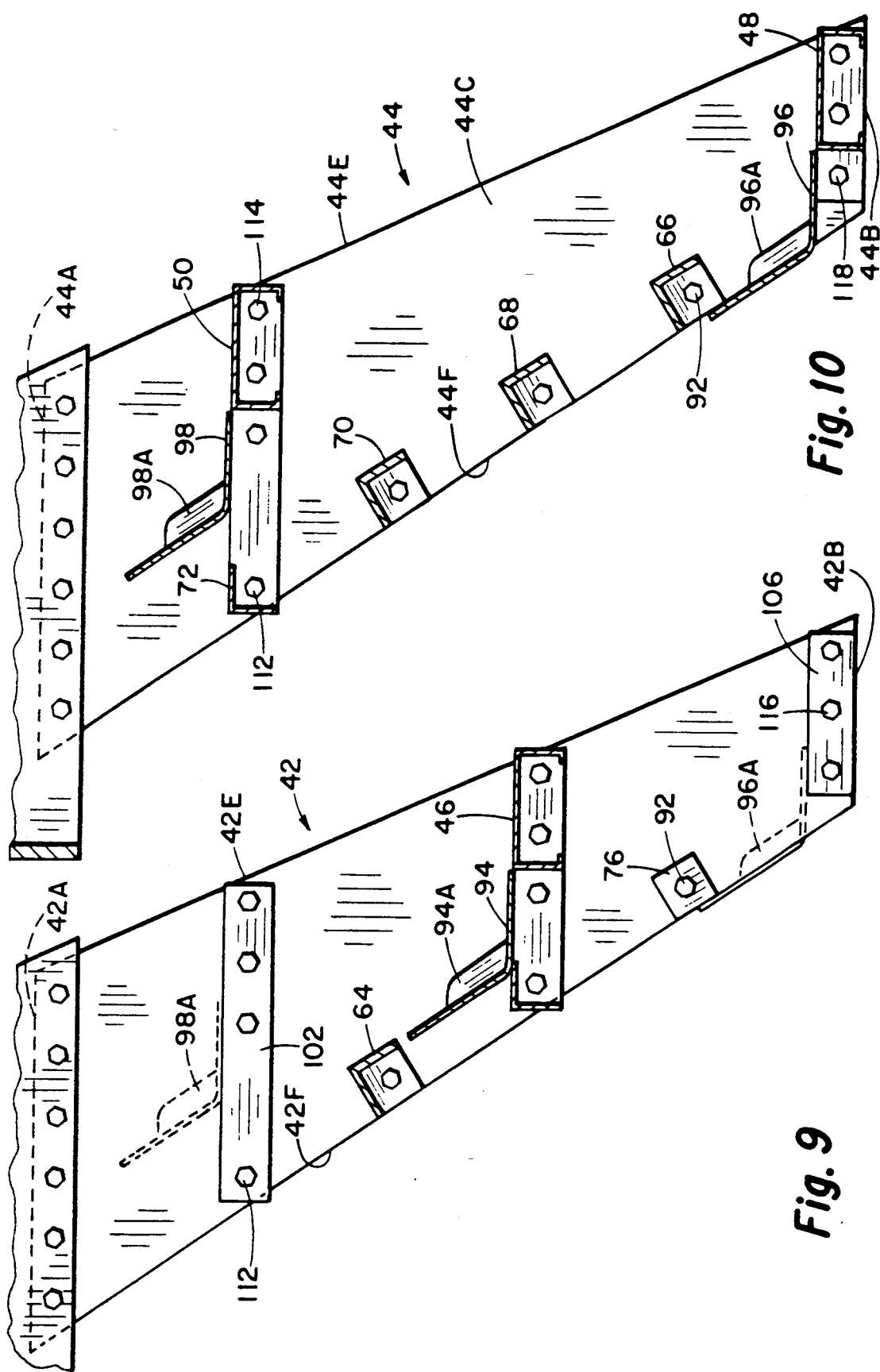

FLEXIBLE LADDER FOR USE ON MOVING CONVEYANCES

BACKGROUND OF THE INVENTION

Large off-road machines designed to carry huge loads of dirt, or similar material are of such size that a ladder is required for an operator of the machines to climb up to the vehicle cab and to permit the operator to climb down off the machine. The lower end of such ladder must be close to the ground to permit the operator to easily, comfortably and safely step up to the first step and to thereby reach succeeding steps so that the operator can expeditiously climb up to the cab elevation. For this reason, the first step of a ladder for such a machine must preferably be not more than approximately 20 to 26 inches from ground level. Since the terrain over which large earth or ore carrying machines must travel is frequently littered with rocks, large clumps of dirt or ore or generally uneven ground, a problem arises in that a fixed ladder extending close to the ground frequently encounters such objects and if the ladder is formed of a solid structural member, the ladder will be bent and permanently damaged. Consequently, maintaining safe ladders for use by an operator to mount onto or off of a large off-road machine has been a serious problem. An object of the present invention is to provide an improved flexible ladder for use on moving conveyances which affords a means of safe usage by the operator to mount onto or off of large off-road machines and which is not easily damaged when obstructions are encountered by the ladder.

SUMMARY OF THE INVENTION

The present disclosure is a flexible ladder for use on moving conveyances. The ladder provides frontal stability but lateral flexibility so as to permit an operator to safely mount onto or off of a conveyance but wherein the possibility of damage when an obstruction is encountered by the ladder is substantially reduced.

The ladder is formed of a first, a second and a third strut member. Each of the strut members is formed of a tough, flexible material, such as rubber belting. Each of the strut members is supported in a generally vertical plane, the strut members being generally parallel to each other. The second strut member is positioned between the first and third strut members. The spacing between the first and second strut member is at least sufficient to receive the foot of a user therebetween, and the spacing between the second and third strut members is substantially equal to that between the first and the second strut members. Each of the strut members is generally flat with opposed first and second sides, with a forward edge and a rearward edge and each has an upper end and a lower end.

A first set of steps is positioned between the first and second strut members. This first set is formed of at least one step, the number of steps depending upon the height of the flexible ladder. Each step is generally horizontal and has opposed first and second ends. The first end of each step is secured to the first strut member, and the second end of each step is secured to the second strut member. The steps are vertically spaced apart from each other.

A second set of steps comprising at least two steps depending upon the height of the flexible ladder, each of the steps being generally horizontal and having opposed first and second ends. The first end of each step in the second set is secured to the second strut member, and the second end of each step in the second set is secured to the third strut member. The steps are vertically spaced apart from each other.

The upper ends of each of the strut members is attached to a moving conveyance. This may be accomplished by means of horizontally extending structural members to which the upper ends of each of the strut members is affixed.

In the preferred embodiment, the steps of the first set are vertically displaced relative to the steps of the second set in an alternate arrangement. In this embodiment the user employs a ladder by stepping on alternate sets of steps at increasing elevational heights as the user mounts the ladder.

In a further preferred embodiment, the first strut member is of shorter length than the second and third strut members so that the lower end of the first strut member is vertically positioned above the lower end of the second and third strut members, with the first step in the first set of steps being secured between the first and second strut members at the lower end of the first strut member.

The strut members are preferably arranged so that the forward edge thereof is inclined outwardly at an obtuse angle relative to the horizontal to improve the comfort and safety of use of the flexible ladder.

In another alternate arrangement, in order to increase the frontal stiffness of the flexible strut members spaced apart metal straps are secured to the strut members, preferably along the rearward edge thereof.

A better understanding of the invention will be had by reference to the following description and claims, taken in conjunction with the attached drawings.

DESCRIPTION OF THE DRAWINGS

FIG. 1 is a front elevational view of a typical large off-road machine for use in earth moving, hauling ore or the like. FIG. 1 shows a ladder arrangement for use by the driver in climbing from the earth's surface to the platform that supports the cab of the operator and shows, as an integral part of the ladder system, a flexible ladder that forms the lower most part of the ladder system.

FIG. 7 is a front elevational view of the flexible ladder system showing an alternate design.

FIG. 8 is a side elevational view of the flexible ladder system alternate design taken along the line 8—8 of FIG. 7.

FIG. 9 is an elevational cross-sectional view taken along the line 9—9 of FIG. 7.

FIG. 10 is an elevational cross-sectional view taken along the line 10—10 of FIG. 7.

DESCRIPTION OF THE PREFERRED EMBODIMENT

Figure 1:
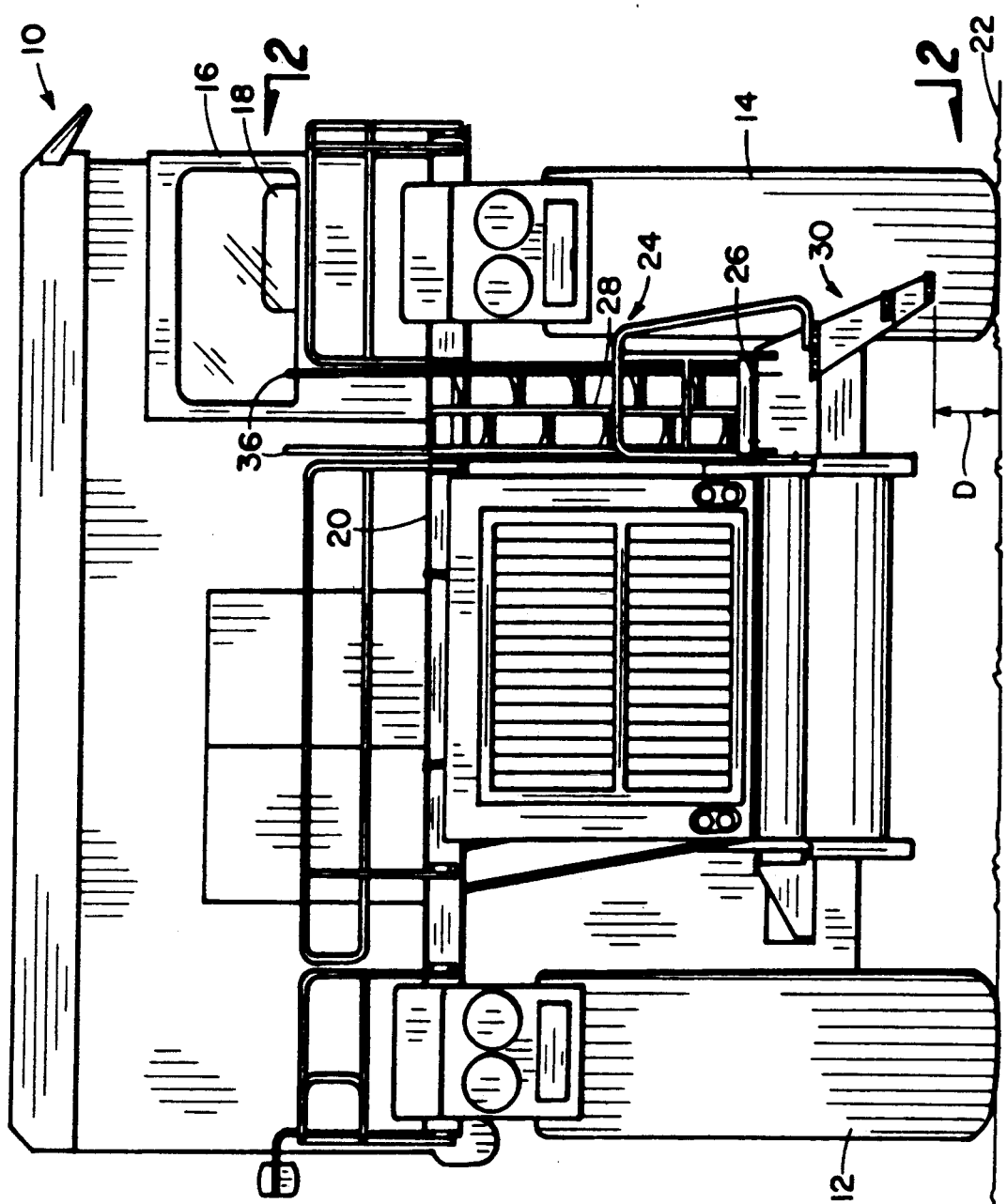
Figure 5:
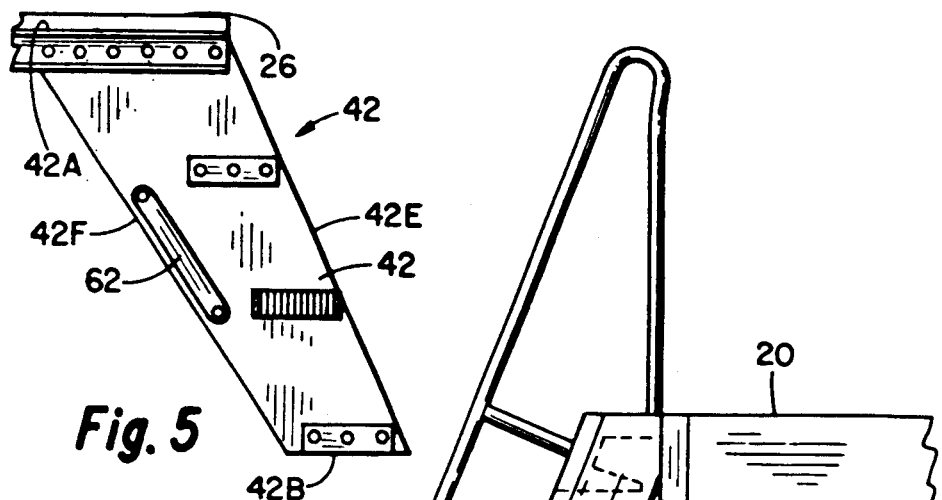
FIG. 5 is a cross-sectional elevational view taken along the line 3—3 of FIG. 4 and showing more details of the flexible ladder system.

Referring to the drawings and first to FIG. 1, the environment in which the flexible ladder system of this invention is typically employed is illustrated. FIG. 1 is a front elevational view of a typical large, off-road machine used for hauling ore, moving earth or the like. The machine is indicated generally by the numeral 10 and two front tires are indicated by numerals 12 and 14. The operator's cab is indicated by the numeral 16 with the top portion of the driver's seat appearing through a front window in the cab and indicated by the numeral 18. A cab platform 20 provides the horizontal surface on which cab 16 is positioned. In order to enter cab 16 it is necessary for the operator to move from the ground surface 22 up to the platform 20. For this purpose a ladder system must be employed and the present disclosure is directed toward an improved portion of such a ladder system.

Figure 2:
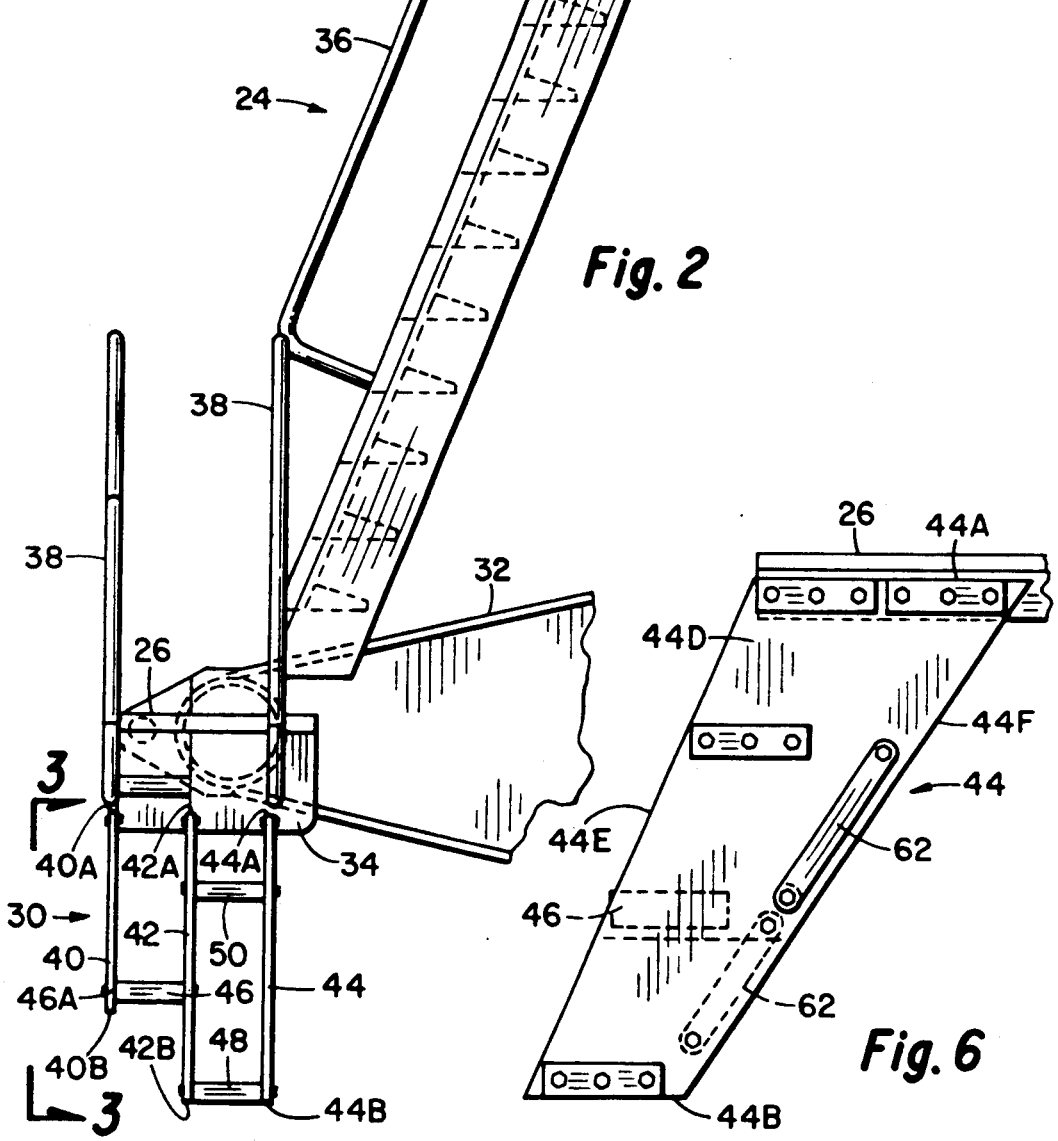
FIG. 2 is a partial elevational view, enlarged, taken along the line 2—2 of FIG. 1 showing only a portion of the structural frame of the machine but showing the ladder system, including the lower flexible portion of the ladder system.

The ladder system as illustrated in FIG. 2 includes a fixed portion, generally indicated by the numeral 24, which ascends from a subplatform 26 up to platform 20. The fixed ladder system 24 is shown as formed of an alternate step design, that is, wherein each tread of the ladder is configured to receive one foot of the user, with the user placing his feet in alternate sides of a middle strut member 28 as he ascends or descends the ladder. The use of the alternate strut design for ladder 24 is by way of example only, instead, the ladder 24 could be of the standard type wherein each tread extends the full width of the ladder.

The present disclosure is directed toward the lower flexible portion of the ladder system, generally indicated by the numeral 30. The flexible ladder system or portion 30 is provided as a means for the truck operator to ascend from the ground surface 22 up to the subplatform 26. When the operator reaches the subplatform 26 he pivots 90 degrees and then ascends the fixed ladder portion 24. In the illustrated arrangement, the flexible ladder system 30 is oriented so that the operator climbs in a vertical plane which is perpendicular to the normal direction of travel of the vehicle, while the fixed ladder portion 24 is in a vertical plane parallel to the line of travel. This is by way of example only and the disclosure is not limited to this arrangement since it can be seen that the entire ladder system including the fixed portion 24 and the flexible portion 30 could be all in one vertical plane perpendicular to the direction of travel of machine 10.

It can be seen from FIG. 1 that if a large obstruction such as a rock, clump of dirt or ore, or the like is encountered by the flexible ladder portion 30, which possibility is ever present since the flexible ladder portion must be close enough to ground surface 22 to permit the operator to easily mount on the machine or exit from the vehicle, the flexible ladder portion 30 deflects when contacting obstructions without permanent damage to the flexible ladder portion 30.

Referring to FIG. 2, more details of the ladder system are shown. In FIG. 2 the only portion of the machine illustrated is the frame or structural portion 32 of machine 10. The structure includes a vertical plate 34 mounted to the frame 32 which is formed in conjunction with the subplatform 26. The fixed ladder portion 24 extends from the frame portion 32 upwardly and at an angle inclined relative to the vertical of the operator's platform 20. Hand rails 36 are provided for the fixed ladder portion 24, and hand rails 38 are provided from the flexible ladder portion 30 onto the subplatform 26.

Figure 4:
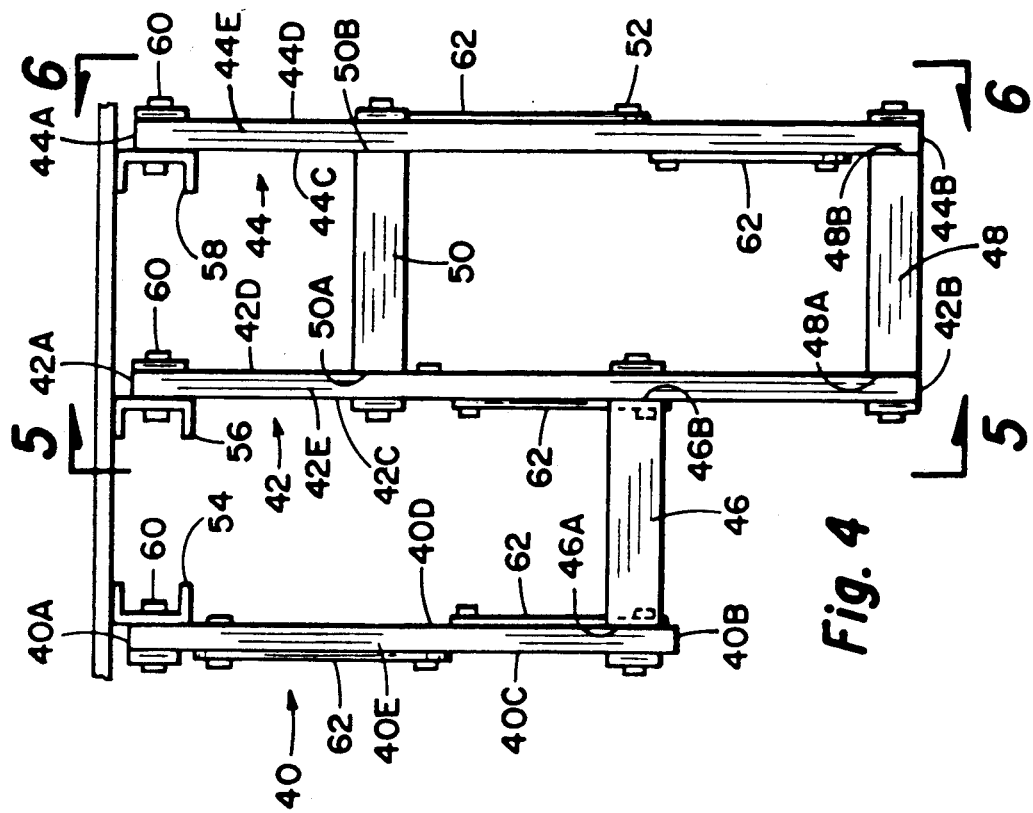
FIG. 4 is a front elevational view of the flexible ladder system of FIG. 3.

The flexible ladder portion 30 is formed by a first flexible strut member 40, a second flexible strut member 42 and a third flexible strut member 44. Each of the strut members 40, 42, 44 are in vertical planes and spaced apart from each other, with the second strut member 42 being between the first and third strut members. Each of the strut members is made of strong, flexible material, such as rubber belting. The first strut member 40 has an upper edge 40A and in like manner, the second strut member 42 has an upper edge 42A and third strut member an upper edge 44A. Each strut member has a lower edge, indicated by the numerals 40B, 42B and 44B respectively. As shown in FIG. 4, the strut members have a first side indicated by numerals 40C, 42C and 44C. Each of the strut members has an opposed side indicated by the numerals 40D, 42D and 44D respectively. To complete the definition of the strut members, each has a front edge indicated by 40E, 42E and 44E and a rear edge indicated by 40F, 42F and 44F.

Positioned between the first flexible strut member 40 and the second flexible strut member 42 is a first set of steps, which in the illustrated embodiment consists of a single step 46, although obviously the number of steps would increase if the length of the flexible ladder was longer than that illustrated. Step 46 has a first end 46A which is secured to flexible strut member second side 40D. The second end 46B of the first step is secured to the second strut member first side 42C.

Figure 6:
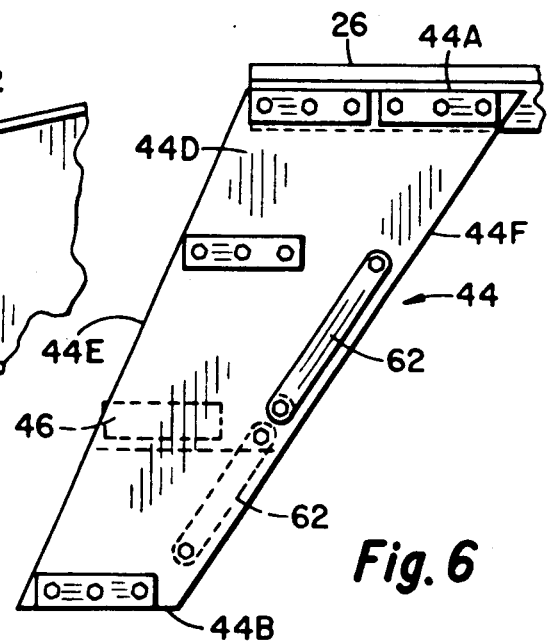
FIG. 6 is an elevational view of the flexible ladder system taken along the line 6—6 of FIG. 4.

A second set of steps is secured between the second strut member 42 and third strut member 44. As seen best in FIGS. 4 and 6, the second set of steps includes a step 48 having ends 48A and 48B and a second step 50 with ends 50A and 50B. The ends 48A and 50A of the steps are secured to the second strut member inner side 42D, and the ends 48B and 50B of the second step are secured to the third strut member first side 44C. The steps may be secured by means of bolts and nuts 52 as illustrated. The steps are preferably of alternating elevations, that is, the elevation of the second set of steps between the second strut member 42 and the third strut member 44 are vertical offset with respect to the elevation of the first set of steps between the first strut member 40 and the second strut member 42. This is a preferred but not a mandatory arrangement. Obviously, the steps could be in horizontal alignment and in a manner in which a ladder is typically formed, however, there are advantages in an alternate step design as illustrated as will be explained subsequently.

The vertical strut members 40, 42, 44, may be supported in a variety of ways. In the method illustrated, horizontally extending structural members 54, 56 and 58, which are illustrated as being short lengths of channel iron, are employed. The structural members 54, 56 and 58 extend from the machine structure and to the upper ends 40A, 42A and 44A of the flexible strut members and are secured to the structural members 54, 56 and 58 by the use of bolts 60.

When the vertical strut members 40, 42, 44 are formed of strong but yet flexible material, such as rubber belting, the strut members provide sufficient frontal stability so that the flexible ladder portion 30 will support the weight of the average user without any additional reenforcement. However, to increase the frontal stiffness, a series of metal straps 62 may be employed as illustrated. Each of the metal straps is of short length and preferably of lengths approximately that between alternate steps, although the lengths of the straps may be greater if desired. The straps 62 are secured by means of bolts and nuts to the flexible strut members 40, 42, 44 and preferably adjacent the rearward edges of 40F, 42F, 44F respectively, as illustrated in FIGS. 3, 4, 5 and 6. These flexible straps permit the vertical strut members to deflect laterally if an object is encountered by the lower end portion of the flexible ladder section, but increase the frontal stability so that the flexible ladder portion will support users of greater weight.

In the preferred arrangement as illustrated, the first flexible strut member 40 is of shorter length than the second and third flexible strut members 42 and 44. This is particularly preferably when the alternate step configuration is employed as illustrated. By using such alternate step configuration which permits a shorter first flexible strut member 40, the utility of the flexible ladder is not decreased but, at the same time, the flexibility is improved.

Figure 3:
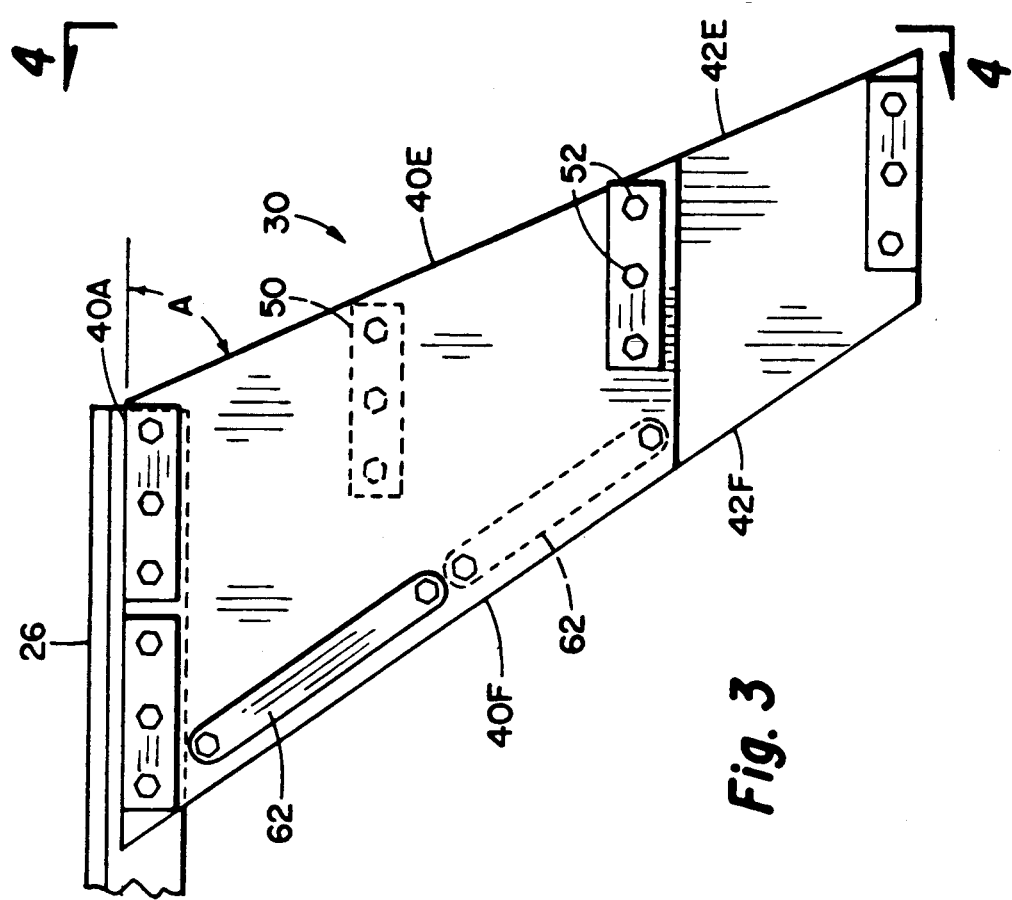
FIG. 3 is an enlarged fragmentary elevational view taken along the line 3—3 of FIG. 2 and showing more details of the flexible ladder system.

The front edge of each of vertical strut members 40, 42 and 44 preferably extends at an angle A as seen in FIG. 3 of about 68° relative to the horizontal. This angular extension greatly improves the convenience of use by the operator. First step 48 is spaced a distance D above ground surface 22 (see FIG. 1) of about 20 to 26 inches.

The flexible ladder as illustrated and described herein provides for increased utility and safety in mounting onto and off of a large machine but, at the same time, provides a ladder which is less likely to be permanently damaged when obstruction is encountered as the machine moves over rough terrain.

FIGS. 7 through 10 show an embodiment of the invention having some features which are different than those shown in FIGS. 1–6. Referring specifically to FIGS. 7–10, the flexible ladder is provided with a series of horizontal spacers, indicated by the numeral 64, 66, 68, 70 and 72. Spacer 64 is between first and second flexible strut members 40 and 42, while spacers 66, 68, 70 and 72 are positioned between flexible strut members 42 and 44. Each of the spacers is horizontally positioned and spaced apart from each other and spaced apart from steps 46, 48, and 50.

In the illustrated arrangement each of the steps is formed by a length of angle-iron, being L-shaped in cross-sectional configuration, and each has a metal plate welded on each end of each angle-iron, the metal plates being indicated by the letters "A" and "B", such as 64A and 64B; 66A and 66B; 68A and 68B; 70A and 70B; and 72A and 72B. To retain the spacers opposed square metal plates 74, 76, 78, 80, and 82 are spaced opposite the ends of the spacers. By means of bolts 84, 86, 88, 90 and 92, positioned between the metal plates at the end of each spacers and the opposed metal plates 74–82 the spacers are held in position.

The embodiment of FIGS. 7–10 include the use of toe plates, generally indicated by the numerals 94, 96, and 98, there being a toe plate spaced rearwardly from each of the steps 46, 48 and 50. Each of the toe plates includes an upwardly inclined portion 94A, 96A and 98A respectively, which serves to limit the possibility of a foot of a user extending fully between adjacent strut members. To secure the steps and toe plates, elongated horizontal metal straps 100, 102, 104, 106, and 108 are employed which receive bolts 110, 112, 114, 116, and 118 respectively.

Thus, the arrangement of FIGS. 7–10 show an embodiment which does not utilize vertically extending metal straps as the embodiment described in FIGS. 1–6, and in which improved flexibility and safety is achieved through the use of the spacers and toe boards. The embodiment of FIGS. 7–10 functions in the same way to allow a user to freely walk up the flexible ladder to mount onto a machine but yet permits the flexible ladder to deflect laterally if an object on the ground is encountered by the lower end of the flexible ladder as the machine moves.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A ladder for use on moving conveyances providing frontal stability but lateral flexibility, comprising:

a first, a second and a third strut members each formed of flexible material and each being supported in a generally vertical plane, the strut members being generally parallel to each other with the second strut member between the first and third strut members, the spacing between the first and second strut members being at least sufficient to receive the foot of a user therebetween and the spacing between the second and third strut members being substantially equal to that between the first and second strut members, each strut member being generally flat with opposed first and second sides, with a forward edge and a rearward edge, and each having an upper end and a lower end;

a first set of steps comprising at least one step, each step being generally horizontal and having opposed first and second ends, the first end of each step of the first set being secured to said first strut member and the second end of each step of the first set being secured to said second strut member, the steps being vertically spaced apart from each other;

a second set of steps comprising at least two steps, each step being generally horizontal and having opposed first and second ends, the first end of each step of the second set being secured to said second strut member and the second end of each step of the second set being secured to said third strut member, the steps being vertically spaced apart from each other; and means of attachment of said upper end of each of said strut members to a moving conveyance.

2. A ladder according to claim 1 wherein said first set of steps are vertically displaced relative to said second set of steps in an alternating arrangement.

3. A ladder according to claim 2 wherein said first strut member is of shorter length than said second and third strut members and wherein said first strut member lower end is thereby vertically positioned above the lower ends of said second and third strut members.

4. A ladder according to claim 1 wherein said first, second and third strut members forward edges are inclined at an obtuse angle relative to the horizontal.

5. A ladder according to claim 4 wherein said angle is about 68 degrees.

6. A ladder according to claim 1 including elongated metal straps affixed to one side of at least some of said strut members.

7. A ladder according to claim 1 including elongated metal straps affixed to one side of each of said strut members adjacent said rearward edges.

8. A ladder according to claim 1 including:
a first set of horizontal spacers comprising at least one spacer, each spacer having opposed ends, one end of each spacer of the first set being affixed to said first strut member and the other end being affixed to said second strut member, the spacers of the first set being vertically spaced from said first set of steps; and
a second set of horizontal spacers comprising at least one spacer, each spacer having opposed ends, one end of each spacer of the second set being affixed to said second strut member and the other end of each spacer of the second set being affixed to said third strut member, the spacers of the second set being vertically spaced from said second set of steps.

9. A ladder according to claim 1 including:
a toe board member for each said step, each having an upwardly inclined portion serving to limit the possibility of the foot of a user extending fully between adjacent strut members.

* * * * *